United States Patent
Uszkur et al.

(10) Patent No.: US 12,384,326 B2
(45) Date of Patent: Aug. 12, 2025

(54) SAFETY APPARATUS FOR INDICATING THE USAGE STATE OF A SEAT BELT

(71) Applicant: Aptiv Technologies AG, Schaffhausen (CH)

(72) Inventors: Marek Uszkur, Dublin (IE); Artur Boron, Dublin (IE); Lukasz Bohdan, Dublin (IE)

(73) Assignee: Aptiv Technologies AG, Schaffhausen (CH)

( * ) Notice: Subject to any disclaimer, the term of this patent is extended or adjusted under 35 U.S.C. 154(b) by 790 days.

(21) Appl. No.: 17/645,724

(22) Filed: Dec. 22, 2021

(65) Prior Publication Data

US 2022/0227331 A1 Jul. 21, 2022

(30) Foreign Application Priority Data

Jan. 18, 2021 (GB) ...................... 2100619

(51) Int. Cl.
*B60R 22/48* (2006.01)
*B60R 22/34* (2006.01)

(52) U.S. Cl.
CPC .............. *B60R 22/48* (2013.01); *B60R 22/34* (2013.01); *B60R 2022/4816* (2013.01); *B60R 2022/4825* (2013.01); *B60R 2022/4866* (2013.01)

(58) Field of Classification Search
CPC . B60R 22/48; B60R 22/34; B60R 2022/4816; B60R 2022/4825; B60R 2022/4866
See application file for complete search history.

(56) References Cited

U.S. PATENT DOCUMENTS

| 8,611,608 B2 | 12/2013 | Fan et al. |
| 10,691,955 B1 | 6/2020 | Gracio et al. |
| 10,773,683 B1 * | 9/2020 | Ghannam ............... B60R 22/48 |

(Continued)

FOREIGN PATENT DOCUMENTS

| CN | 2756044 | 2/2006 |
| CN | 104417489 A | 3/2015 |

(Continued)

OTHER PUBLICATIONS

"Extended European Search Report", EP Application No. 20214085.1, Jun. 9, 2021, 7 pages.

(Continued)

*Primary Examiner* — Joseph H Feild
*Assistant Examiner* — Sharmin Akhter
(74) *Attorney, Agent, or Firm* — Harness, Dickey & Pierce, P.L.C.

(57) ABSTRACT

Safety apparatus for indicating the usage state of a seat belt. The seat belt has a strap spooled from a retractor and being lockable to a buckle by a tongue. The apparatus has an indicator unit for mounting to an upper part of a seat. A lock indicator is provided on the indicator unit and, in use, is operably connected to the buckle for indicating a state when the tongue has been locked into the buckle. A strap indicator is provided for indicating a state when a spooled length of the strap exceeds a threshold corresponding to a predetermined minimum length of strap needed to secure a body with the seat belt. The lock indicator and the strap indicator are detectable by a camera.

18 Claims, 4 Drawing Sheets

(56) References Cited

U.S. PATENT DOCUMENTS

| | | |
|---|---|---|
| 10,953,850 B1 | 3/2021 | Pertsel et al. |
| 2009/0058061 A1 | 3/2009 | Fuisz et al. |
| 2016/0144752 A1* | 5/2016 | Frank ................ B60N 2/42709 |
| | | 297/216.11 |
| 2017/0291576 A1 | 10/2017 | Le et al. |
| 2019/0147262 A1 | 5/2019 | Kuehnle et al. |
| 2019/0197326 A1* | 6/2019 | Ohno ..................... B60R 22/12 |
| 2020/0231109 A1 | 7/2020 | Baltaxe et al. |
| 2020/0298794 A1 | 9/2020 | Dingli |
| 2020/0298796 A1 | 9/2020 | Cech et al. |
| 2020/0320318 A1* | 10/2020 | Ramaglia ............... G06V 20/59 |
| 2021/0086715 A1 | 3/2021 | Baek et al. |

FOREIGN PATENT DOCUMENTS

| | | |
|---|---|---|
| CN | 104700068 A | 6/2015 |
| CN | 105109448 A | 12/2015 |
| CN | 105667450 A | 6/2016 |
| CN | 105946786 | 12/2018 |
| CN | 109886205 A | 6/2019 |
| CN | 110053582 A | 7/2019 |
| DE | 10133759 | 7/2003 |
| DE | 10326840 | 12/2004 |
| DE | 102007008602 | 11/2007 |
| DE | 102016014867 A1 | 6/2017 |
| DE | 102019101355 A1 | 7/2019 |
| DE | 102019211200 | 2/2021 |
| EP | 1980452 | 10/2008 |
| EP | 2937251 A1 | 10/2015 |
| FR | 2877279 | 5/2006 |
| JP | 2007055294 | 3/2007 |
| JP | 2010113506 A | 5/2010 |
| JP | 2015066983 A | 4/2015 |
| JP | 2020073372 | 5/2020 |
| WO | 2018213346 | 11/2018 |

OTHER PUBLICATIONS

"Extended European Search Report", EP Application No. 22178711.2, Nov. 9, 2022, 8 pages.

"Extended European Search Report", European Application No. 20150594.8, Jul. 17, 2020, 7 pages.

"Search Report", GB Application No. 2100619.2, Jun. 18, 2021, 1 page.

"Foreign Office Action", CN Application No. 202110003234.1, Sep. 20, 2022, 16 pages.

"Extended European Search Report", EP Application No. 21215512.1, Jun. 3, 2022, 7 pages.

* cited by examiner

SAFETY APPARATUS FOR INDICATING THE USAGE STATE OF A SEAT BELT

CROSS-REFERENCE TO RELATED APPLICATION

This application claims priority to United Kingdom Patent Application Number 2100619.2, filed Jan. 18, 2021, the disclosure of which is hereby incorporated by reference in its entirety herein.

BACKGROUND

Modern vehicles include ever increasing numbers of safety devices and systems, motivated not only by regulatory pressures but also consumer demand for improved road safety. One common feature is to provide a seat belt reminder or safety warning system for ensuring that occupants of a vehicle have buckled their seat belts. Initially, this system was provided only in respect of the first row of seats of a vehicle, and in some countries this feature has become a regulatory requirement for all new vehicles. However, as both regulatory trends and consumer expectations are directed toward increased safety compliance, there is a growing demand to provide seat belt reminder systems which cover every seat in a vehicle. For example, parents often wish to be alerted if a child in a passenger seat has unbuckled their belt.

Conventional seat belt reminder systems are normally based on a combination of a PODS (Pressure Occupant Detection System) and a lock switch system. The PODS is fitted into the vehicle seat base and is used to detect an occupant by detecting their weight on the seat. The lock switch system is fitted into the seat belt buckle and confirms once the seat belt tongue has been locked into place. These systems then feed a safety controller to issue a reminder if a seat is occupied but the seat belt is unbuckled. There are however a number of shortcomings with this conventional system.

In this respect, PODS and lock switch systems require an electrical harness to be connected to every vehicle seat that is to be covered by the system. Although this is manageable for the front row seats, it becomes much more challenging when the system is to be extended to cover the second, third, or further rows of seats in larger vehicles. In this situation, additional wire harness cabling and connection terminals are needed to connect the components, which adds considerably to the expense and complexity of the system. However, the issue becomes even more complex in vehicles, which have reconfigurable seats, such as in people carriers and larger sports utility vehicles. For example, some vehicles allow the second or later row seats to be individually moved forward or back, or flipped around to face the opposite direction, or even removed entirely. To accommodate this functionality, whilst also providing a conventional seat belt reminder system, would require connector terminals for the PODS and lock switch sensors to be provided on the vehicle floor for every possible seat configuration. This is typically not viable for cost reasons.

In recent years, new seat belt reminder systems have been proposed, which utilize cameras within the vehicle's interior, and then determine seat occupancy and seat belt compliance based on image recognition processing using a neural network. To improve reliability, some systems also make use of patterns printed on the seat belt strap, which can be more easily identified in the image and thereby help to confirm that the strap has been fitted across the chest of an occupant. In principle, such camera-based systems could allow the occupancy and seat belt status to be determined without needing PODS or lock switch sensors to be provided in every seat. However, in practice, such systems are often not sufficiently reliable.

In this respect, a limitation of camera-based systems is that they require the seat belt and the buckle to be visible to the camera. However, these parts are prone to being covered by the nature of their operation. For example, jackets, blankets, and other objects will often be on an occupant's lap or thrown on adjacent seats, where they may cover part or all of the seat belt or the buckle. Obstructing the camera's field of view in this way makes it extremely difficult for the neural network to interpret the image data consistently. As such, the functionality of the system may be compromised. To address this, camera-based systems are often used in conjunction with PODS and/or lock switch sensors to improve overall reliability. However, this only leads to even greater cost and complexity. A further drawback is that, in vehicles that do have reconfigurable seats, it is relatively complex to hardcode or train the neural network to be able to operate effectively in all possible seating combinations. Again, this leads to increased cost and processing overheads.

A further complexity relates to a behavior pattern of some occupants to attempt to circumvent seat belt safety systems. For example, an occupant may connect the tongue directly into the buckle before they sit down, so that the strap is deployed behind their back once they are seated. Equally, tamper devices are available for locking into the buckle to replicate the tongue being locked into place. Conventional PODS and lock switch systems cannot detect this type of behavior, and although camera-based systems should provide some detection, this is limited by requiring the seat belt strap to be visible. For safety regulators, this potential for misuse presents a problem because safety systems can only be deemed effective to the extent that they are used properly and consistently.

There therefore remains a need for an improved seat belt safety warning system.

SUMMARY

The present disclosure relates to a safety apparatus for indicating the usage state of a seat belt. The present disclosure is particularly relevant to vehicle seat belt safety systems. For instance, the present disclosure concerns a vehicle camera assembly and method of assembling a vehicle camera assembly.

According to a first aspect, there is provided a safety apparatus for indicating the usage state of a seat belt having a strap spooled from a retractor and being lockable to a buckle by a tongue, the apparatus including: an indicator unit for mounting to an upper region of a seat; a lock indicator provided on the indicator unit and being operably connectable to the buckle for indicating a state when the tongue has been locked into the buckle; and a strap indicator for indicating a state when a spooled length of the strap exceeds a threshold corresponding to a predetermined minimum length of strap needed to secure a body with the seat belt; and wherein the lock indicator and the strap indicator are detectable by a camera.

In this way, an indication of the locking and belt strap status of a seat may be determined by processing images from the camera. By combining this with seat occupancy information, it may therefore be determined whether the seat belt is being used correctly and provide for an alert to be issued in circumstances where it is not. Importantly, by mounting the indicator unit to an upper region of the seat, the indicators may be positioned above an occupant's shoulders, thereby mitigating the risk of obstruction by clothing or other objects. Furthermore, by allowing for camera-based determination, greater flexibility is achieved in terms of allowing seats to be reconfigured, whilst minimizing the costs and complexity associated with additional wire harnesses.

In embodiments, the strap indicator is provided on the indicator unit. In this way, a single indicator unit may be provided, thereby narrowing the field of view required for image analysis to determine the status of the indicators.

In embodiments, the indicator unit includes a mounting for securing the indicator unit to one of a shoulder of the seat and a headrest.

In embodiments, the strap indicator includes a strap indicator element mechanically movable from a negative position to a positive position for indicating the spooled length of strap has exceeded the threshold. In this way, the indicator does not require a power source or connection to the vehicle's electronic systems.

In embodiments, movement of the strap indicator element to a positive position exposes a visible marker for detection by the camera.

In embodiments, the strap indicator element is connected to the retractor by a spool indicator mechanism for moving the strap indicator element proportionally as the strap is spooled from the retractor. In this way, the strap indicator element may be used to gauge the length of strap drawn from the retractor.

In embodiments, the lock indicator includes a lock indicator element mechanically movable from a negative position to a positive position for indicating the tongue has been locked into the buckle.

In embodiments, the lock indicator element is operably connectable to the buckle by a mechanical linkage for moving the lock indicator element into the positive position when the tongue locks into the buckle. In this way, the indicator does not require a power source or connection to the vehicle's electronic systems.

In embodiments, the mechanical linkage includes a seat section for securing within the interior the seat between the buckle and the indicator unit. In this way, the mechanical connection may be built into the seat unit itself.

In embodiments, the seat section includes a Bowden cable. In this way, an inexpensive mechanism is provided for actuating the lock indicator.

In embodiments, movement of the lock indicator element to a positive position exposes a visible marker for detection by the camera.

In embodiments, the safety apparatus, further includes a locator marking provided on the indicator unit for detection by the camera. In this way, the location of the indicator unit may be more easily identified from a camera image based on the detection of the locator markings.

In embodiments, the locator marking includes one or more orientation features for determining seat orientation based on an image detected by the camera. In this way, the orientation of the indicator unit, and hence the seat itself, may be more easily determined through image recognition based on the detected orientation of the markings.

In embodiments, the safety apparatus further includes: a camera unit for detecting an image of the lock indicator and the strap indicator; and a processor for processing the image to identify the state of the lock indicator and the strap indicator. In this way, the apparatus may be provided as a seat belt safety system.

In embodiments, the processor further includes an occupancy detector for detecting an occupant in the seat.

BRIEF DESCRIPTION OF THE DRAWINGS

Illustrative embodiments are now be described with reference to the accompanying drawings in that.

DETAILED DESCRIPTION

Figure 1:
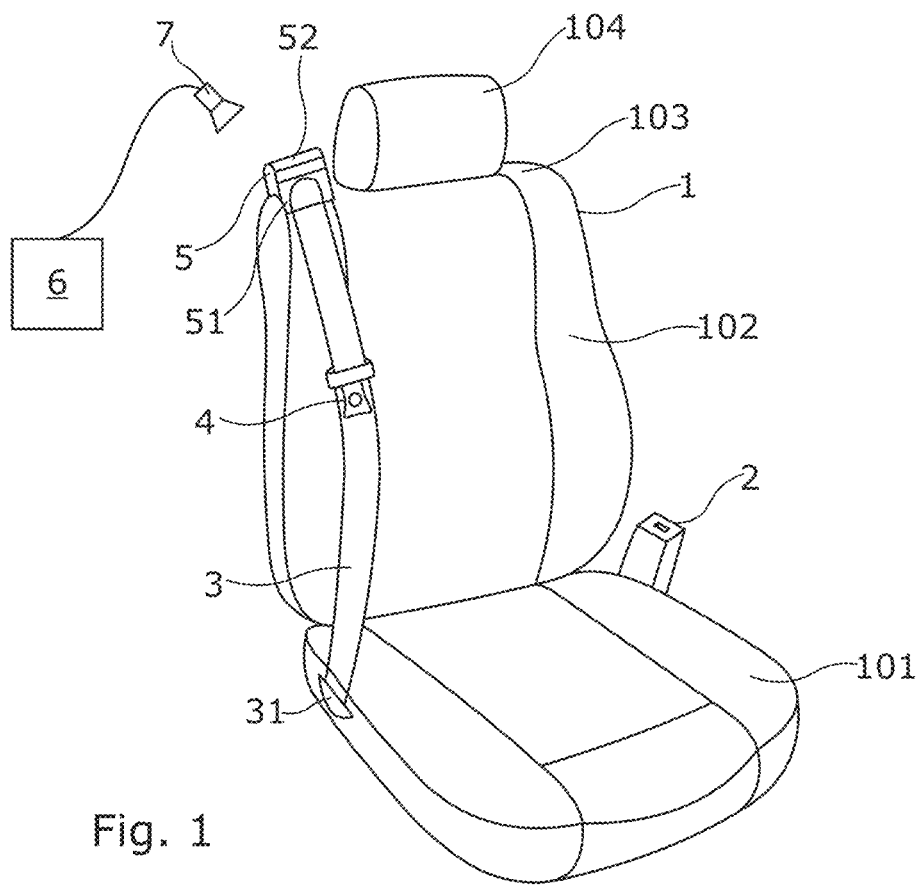
FIG. 1 shows an isometric view of a car seat incorporating an apparatus according to an embodiment.

FIG. 1 shows a vehicle seat 1 incorporating the seat belt safety apparatus according to an illustrative embodiment. The seat includes a base 101, a back part 102, and a headrest 104 mounted to the shoulder region 103 of the back part 102. As such, the shoulder region 103 and the headrest 104 form an upper region of the seat 1.

The seat belt includes a strap 3, which is fixed at one end to a side of the seat base 101 by a strap fixing 31 and is spooled onto a retractor 51 housed within housing unit 5 mounted to the seat's shoulder region 103 at the other end. A tongue 4 is slidably coupled to the strap 3 between the strap fixing 31 and the retractor 51. A buckle 2 for receiving and locking the tongue 4 is provided on the seat base, at the side opposite to the strap fixing 31. As such, to secure the belt in use, an occupant may draw out a length of strap webbing from the retractor 51 and lock the tongue 4 into the buckle 2. This thereby forms a three-point harness between the strap fixing 31, the retractor 51 and the buckle 2, with the strap 3 fitted across both the occupant's chest and lap.

In addition to housing the retractor 51, the housing unit 5 also includes a display face 52 on an upper surface for displaying a number of indicators, as is described in further detail below. As such, the housing unit 5 provides an indicator unit for indicating seat belt status information.

The seat belt safety apparatus further includes a camera 7 and a processor 6, which processes images from the camera 7. The camera 7 and processor 6 are integrated into the vehicle, with the processor 6 being part of the vehicle's embedded safety control systems. The camera 7 is mounted to the ceiling of the vehicle's interior and is directed such that the display face 52 of the housing unit 5 is within its field of view. As such, the indicators provided on the display face 52 are detectable by the camera. In this respect, the indicators may be visible to the camera in the visible light spectrum and/or, for instance, in the infrared spectrum. In the latter case, embodiments may include an infrared emitter within the camera 7 assembly, with the indicators provided as an infrared reflective surface. The use of infrared may allow the indicators to be provided without compromising the aesthetics of the vehicle interior.

The processor 6 processes images from the camera 7 to identify the indicators provided on the display face 52 of the housing unit 5. In embodiments, the processor 6 includes a neural network for this image processing. The processor 6 may also receive feeds from a number of further cameras or other sensors for interpreting other safety input information. In this embodiment, the processor 6 is further used to implement a camera-based occupancy detection system. For this, the processor 6 receives a camera input and uses image recognition to identify when people are seated in each of the seats.

Figure 2:
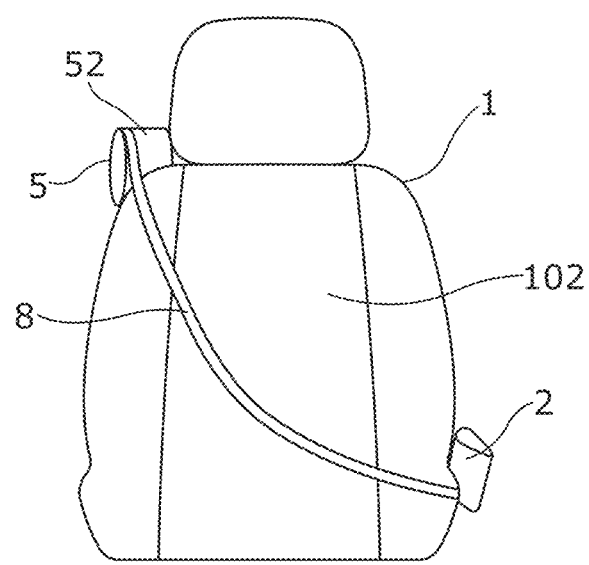
FIG. 2 shows a view of the back part of the car seat showing the lock indicator linkage.

FIG. 2 shows a partially exposed interior front view of the back part 102 of the seat 1. A lock indicator linkage 8 is provided in the seat interior for mechanically linking the locking mechanism in the buckle 2 to a lock indicator in the housing unit 5. As such, when the buckle 2 is locked by the insertion of the tongue 4, this is translated into an operation of the lock indicator linkage 8, which in turn alters the lock indicator, as is described in further detail below. In this embodiment, the lock indicator linkage 8 is provided as a Bowden cable mechanism, wherein a flexible inner actuator cable is used to transmit movements associated with the locking and unlocking of the buckle mechanism through a hollow outer cable.

Figure 3:
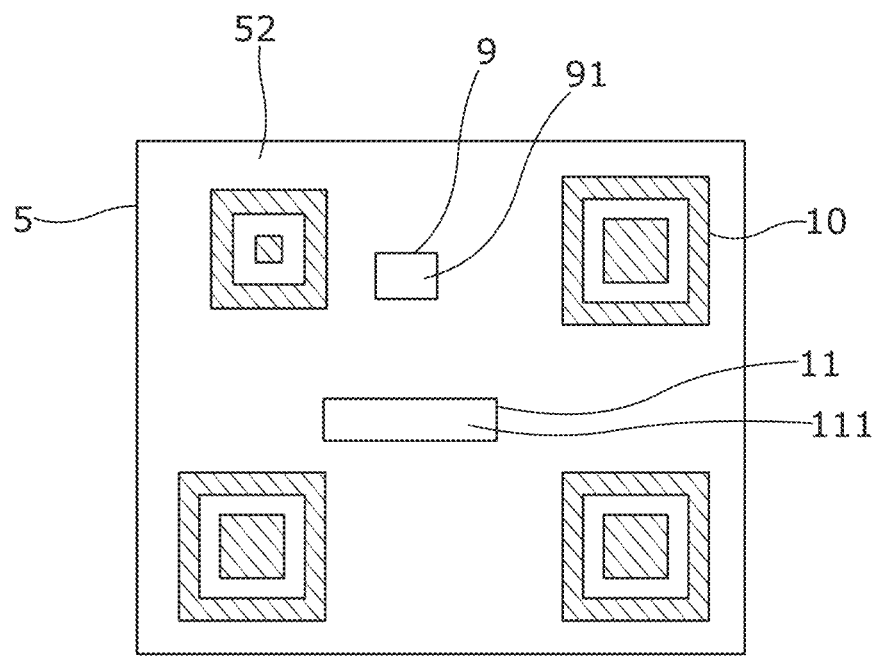
FIG. 3 shows the display face of the housing unit when the belt strap is retracted, and the tongue is unbuckled.
Figure 4:
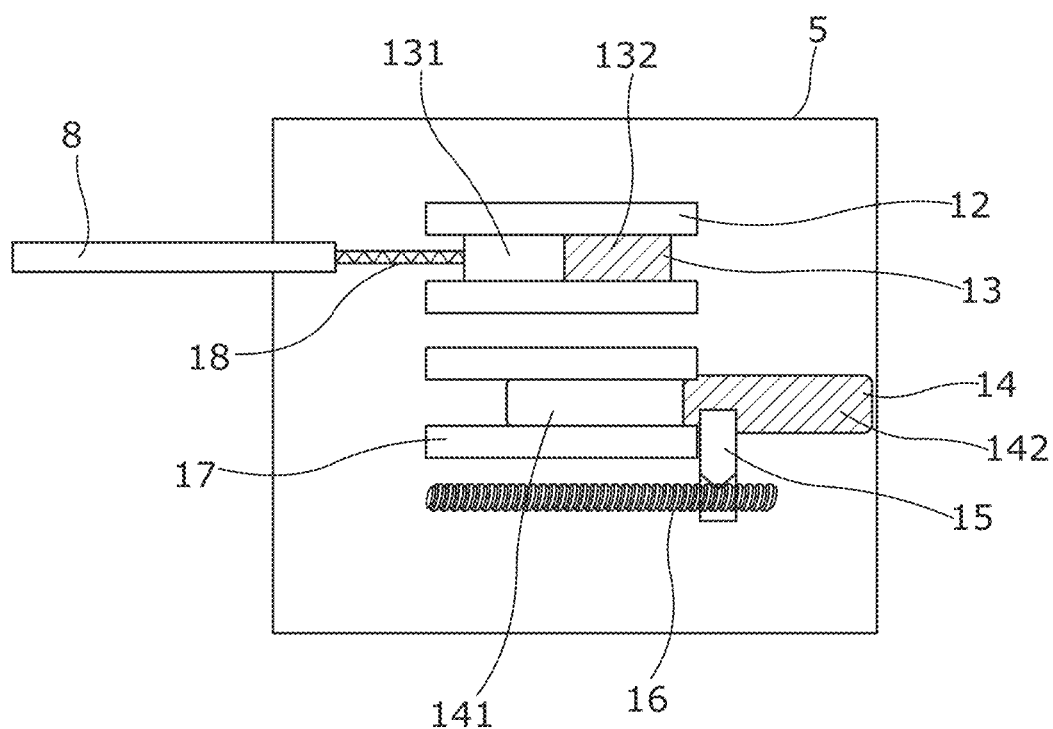
FIG. 4 shows the back face of the housing unit when the seat belt is in the state shown in FIG. 3.

FIGS. 3 and 4 respectively show the top and bottom sides of the display face 52 of the housing unit 5. In these figures, the belt strap 3 is retracted and the tongue 4 is unbuckled. As shown in FIG. 3, the exposed top side of the display face 52 includes the lock indicator 9, a strap indicator 11, and a plurality of locator markers 10.

The lock indicator 9 includes an aperture 91 provided in the display face 52, through which a lock indicator element 13 is exposed. On the bottom side of the display face, as shown in FIG. 4, the lock indicator element 13 is slidably received within a track 12 and is connected at one end to the actuator cable 18 of the lock indicator linkage 8. The lock indicator element 13 includes a darkened section 132 for indicating the buckle is locked and a white section 131 for indicating the buckle is unlocked. Actuation of the buckle locking mechanism causes the actuator cable 18 to move the lock indicator element 13 along the track 12 from a first position where the white section 131 is exposed through the aperture 91, to a second position where the darkened section 132 is exposed. As such, the belt lock indicator 9 provides a visual indicator when the buckle is locked in that the aperture 91 on the display face 52 shows the dark section 132.

The strap indicator 11 includes an elongated aperture 111 in the display face 52, thorough which a strap indicator element 14 is exposed. On the bottom side of the display face 52, as shown in FIG. 4, the strap indicator element 14 is slidably received within a track 17. The strap indicator element 14 is coupled to the seat belt retractor 51 such that it is moved back and forth along the track 17 in response to the strap 3 being spooled into and out from the retractor 51. In this embodiment, this spool indicator mechanism includes a lead screw 16, which is coupled to a lead screw nut connector 15 attached to the strap indicator element 14. As the retractor spool is rotated, a gear arrangement (not shown) causes rotation of the lead screw 16, which is translated to a linear movement of the lead screw nut connector 15 and, in turn, movement of the strap indicator element 14. As such, the strap indicator element 14 is moved proportionally with the length of strap 3 spooled out from the retractor 51.

The strap indicator element 14 further includes a white section 141 and a darkened section 142, with the darkened section 142 marking the point at which a minimum threshold length of strap 3 has been spooled from the retractor 51. The predetermined threshold is set for indicating when a sufficient length of strap 3 has been dispensed for securing around a body. In use, as the strap 3 is fed out from the retractor 51, the strap indicator element 14 is moved along the track 17 from a first position where the white section 141 is exposed through the strap indicator's aperture 111, to a second position where the darkened section 142 is exposed. As the strap 3 continues to feed out from the retractor 51, a larger proportion of the darkened section 142 is visible through the aperture 111. The size of the exposed darkened section 142 thereby provides a gauge for indicating not only that the threshold has been reached, but also the length of strap 3 dispensed. This length indicator may be interpreted by the processor 6 to provide data on the size of the occupant and therefore may be used to determine how the seatbelt is being used. For example, if the determined length of strap 3 is near to a maximum extension, this may be used as an indicator that a rear facing child car seat has been installed on the seat.

The plurality of locator markers 10 are also provided. Primarily, the locator markers 10 facilitate the easy detection of the display face 52 in the image generated by the camera 7. In this embodiment, the locator markers 10 follow a QR code standard, with three position markers and a smaller alignment marker. However, it is to be understood that other styles of markers, which provide an unambiguously identifiable pattern in the output image may alternatively be used.

The locator markers 10 further provide a reference indicator for identifying and interpreting the lock indicator 9 and strap indicator 11 by the image processing algorithms. In addition, because the locator markers 10 provide an orientation indicator, they may also be used by the processor 6 to determine the position, configuration, and orientation of the seats within the vehicle. This output may be used to provide seat configuration information for use in conjunction with the camera-based occupancy detection system. That is, data on where the seats are positioned may be used by the processor 6 to facilitate the identification of passengers in the camera image by limiting the regions of interest to areas where the seats are present. This may thereby improve the accuracy of the camera-based occupancy detection system.

Figure 5:
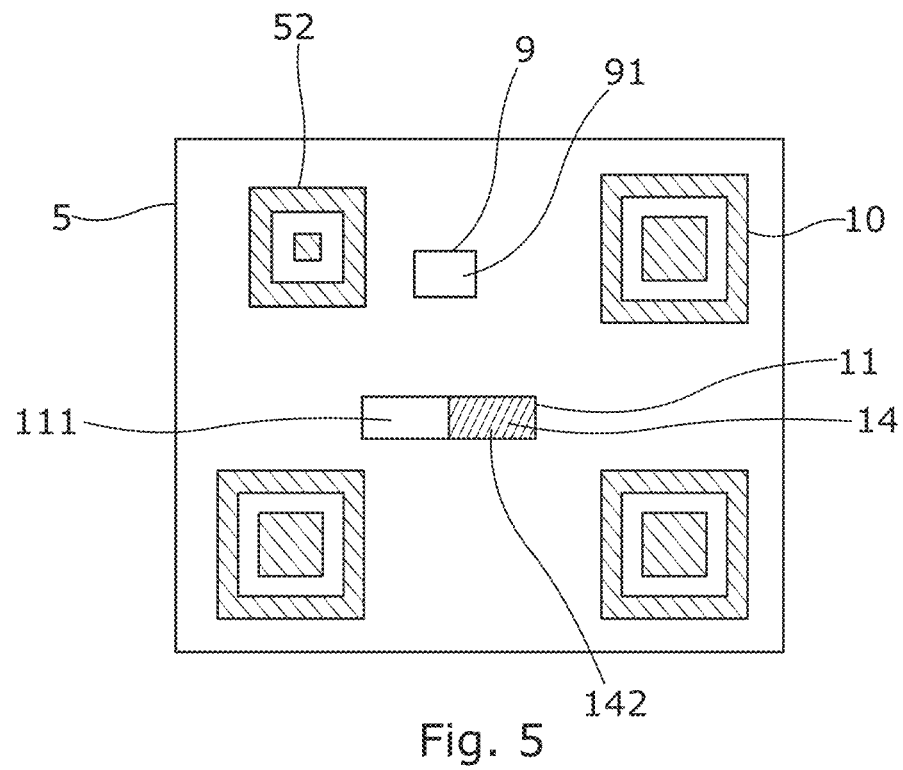
FIG. 5 shows the display face of the housing unit when the belt strap has been partially spooled out, but the tongue is unbuckled.
Figure 6:
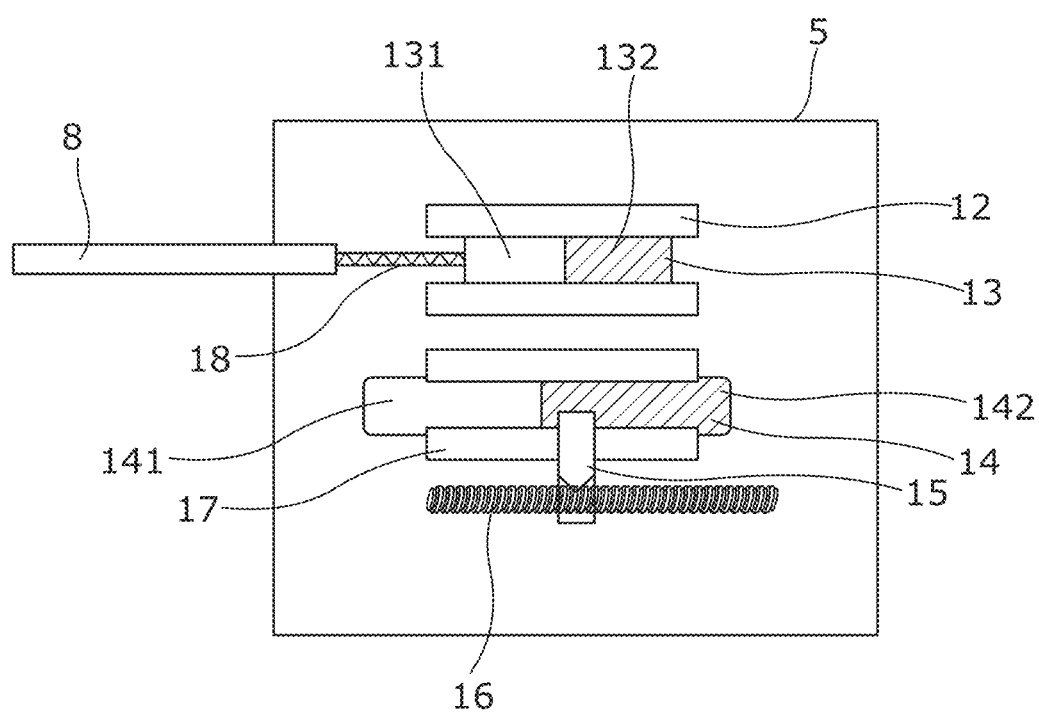
FIG. 6 shows the back face of the housing unit when the seat belt is in the state shown in FIG. 5.

The operation of the lock and strap indicators are now to be described in further detail. FIGS. 5 and 6 respectively show the top and bottom sides of the display face 52 of the housing unit 5 when the belt strap 3 has been partially spooled out, but the tongue 4 is unbuckled. In this position, the darkened section 132 of the lock indicator element 13 is not visible and hence the lock indicator 9 is negative. However, the darkened section 142 of the strap indicator element 14 is visible through its aperture 111 indicating that a sufficient length of strap 3 has been withdrawn for securing around a body.

Figure 7:
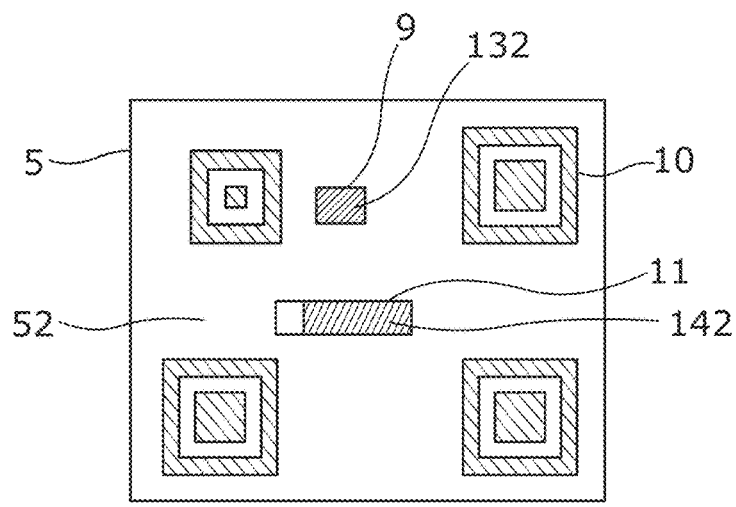
FIG. 7 shows the display face of the housing unit when the belt strap has been secured around a body and the tongue has been locked into the buckle.
Figure 8:
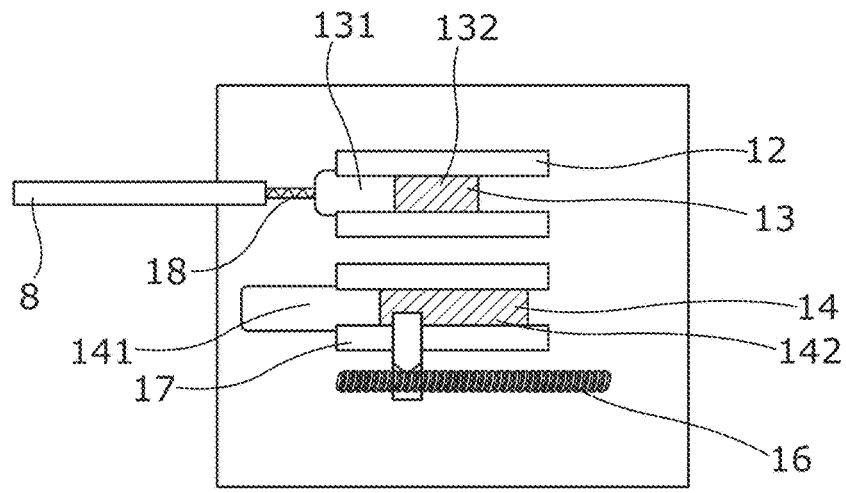
FIG. 8 shows the back face of the housing unit when the seat belt is in the state shown in FIG. 7.

FIGS. 7 and 8 respectively show the top and bottom sides of the display face 52 when the belt strap 3 has been secured around a body and the tongue 4 has been locked into the buckle 2. In this position, the darkened sections 132,142 of both the lock indicator element 13 and the strap indicator element 14 are displayed. As such, the combination of both the positive lock indicator 9 and the strap indicator 11 indicate that the seatbelt is secured appropriately. When it is concurrently determined that the seat 1 is occupied, this indicator information may therefore be used to confirm that safety requirements are being adhered to.

Figure 9:
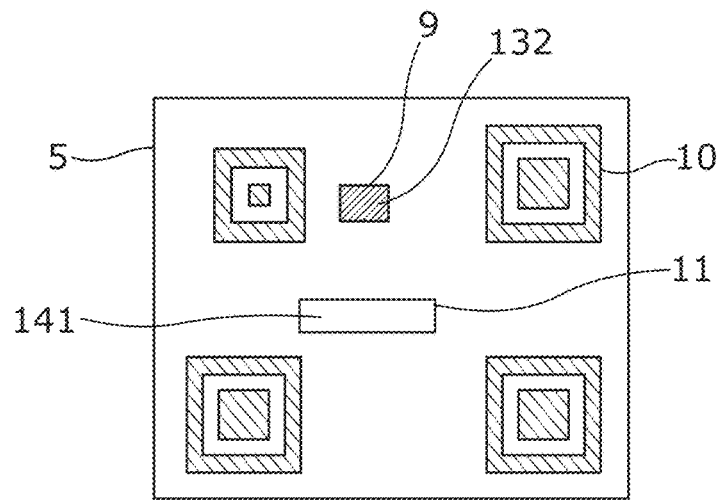
FIG. 9 shows the display face of the housing unit when the belt strap is not fitted around a body and the tongue has been locked into the buckle.

FIG. 9 shows the display face 52 when the belt strap 3 is not fitted around a body, but the tongue 4 has instead been locked directly into the buckle 2. In this scenario, whilst the lock indicator 9 indicates positive locking, the strap indicator 11 shows the length of strap dispensed is below the threshold. As such, this indicator combination may be used to determine that the seat belt is not being used correctly. For instance, if it is concurrently determined that the seat 1 is occupied, it indicates that the strap 3 is fitted behind a users' back. In response, the processor 6 may prompt an audible warning or reminder to occupants of the vehicle to secure their seat belt correctly.

In another scenario, the lock indicator 9 may indicate the tongue 4 is not locked, but the strap indicator 11 shows the length of strap dispensed is above the threshold. If it is concurrently determined that the seat 1 is occupied in this situation, this then indicates that a user as pulled out the strap but is merely holding the tongue 4 rather than attaching it to the buckle.

In use, the processor 6 processes images from camera 7, together with any other camera or sensor inputs, to determine the configuration of seats 1 in the vehicle, which seats are occupied, and the status of the seat belts on the occupied seats. As such, when a seat is identified as occupied, but the combination of the lock and strap indicators indicate the seat belt is not secured correctly, the processor 6 may prompt a warning or alarm to notify the occupants so that they may correct the issue.

Accordingly, the apparatus may provide for the effective determination of seat belt compliance in a wide variety of seat configurations, without requiring electrical wire harnesses to feed each seat independently. Furthermore, the seats themselves may be provided as passive seats, without any internal electronic components. This therefore simplifies their construction, as well as their connection to the vehicle itself. This is especially useful for vehicles with reconfigurable seats.

As the arrangement also allows the indicators to be located on the upper region of the seat, visibility by the camera system can also be maintained in all normal usage scenarios, particularly since, in most vehicles, internal cameras are mounted on the ceiling. As such, the status of the seat belt can be detected even in cases where the passenger is wearing a jacket or is covered by a blanket.

Finally, as the indicators can use simplified markings to convey seat belt status information, the resolution of the camera imager can be relatively low. The algorithms required to interpret this information from the camera images may also be simplified compared to other systems that attempt to interpret the belt status based on the seating and belt position of occupants.

It is to be understood that the embodiment illustrated above shows an application only for the purposes of illustration. In practice, embodiments may be applied to many different configurations, the detailed embodiments being straightforward for those skilled in the art to implement.

In this connection, for example, although in the above illustrative embodiment, the indicator unit has been incorporated into the same unit as the retractor 51, it is to be understood that other arrangements are possible. For example, the indicator unit may be provided separately to the retractor. The indicator unit may also be mounted to other sections of the upper region of the seat back, such as on the headrest 104.

Furthermore, in some embodiments, the lock and strap indicators may be separated. For example, in some vehicles, the retractor 51 is incorporated into the sides or ceiling. In this scenario, the indicator apparatus may be distributed with the strap indicator 11 located with the retractor 51, and the lock indicator 9 mounted to the seat 1.

Moreover, although the illustrative embodiment has been implemented alongside a camera-based occupancy detection system, it is to be understood that other occupancy detection methodologies may alternatively be used. For example, the seats may include a PODS system, albeit that this would require the incorporation of electronics into the seat itself.

Finally, although the illustrative embodiment incorporates locator markers 10, such markers may not be required. For example, in vehicles with fixed seat locations, the indicators 9,11 may be in a limited number of positions and therefore the image recognition process may only need to focus on a limited field of view to read the indicators' status.

What is claimed is:

1. An apparatus, comprising:
   a safety apparatus for indicating the usage state of a seat belt, the seat belt having a strap spooled from a retractor and a tongue being lockable to a buckle, the safety apparatus including:
   an indicator unit for mounting to an upper region of a seat;
   a lock indicator detectable by a camera and provided on the indicator unit and being operably connectable to the buckle for indicating a state when the tongue has been locked into the buckle; and
   a strap indicator provided on the indicator unit and being detectable by the camera for indicating a state when a spooled length of the strap exceeds a threshold corresponding to a predetermined minimum length of strap needed to secure a body with the seat belt.

2. The apparatus according to claim 1, wherein the indicator unit comprises a mounting for securing the indicator unit to one of a shoulder of the seat and a headrest.

3. The apparatus according to claim 1, wherein the strap indicator comprises a strap indicator element mechanically movable from a negative position to a positive position for indicating a spooled length of strap has exceeded the threshold.

4. The apparatus according to claim 3, wherein movement of the strap indicator element to a positive position exposes a visible marker for detection by the camera.

5. The apparatus according to claim 3, wherein the strap indicator element is connected to the retractor by a spool indicator mechanism for moving the strap indicator element proportionally as the strap is spooled from the retractor.

6. The apparatus according to claim 1, wherein the lock indicator comprises a lock indicator element mechanically movable from a negative position to a positive position for indicating the tongue has been locked into the buckle.

7. The apparatus according to claim 6, wherein the lock indicator element is operably connectable to the buckle by a mechanical linkage for moving the lock indicator element into the positive position when the tongue locks into the buckle.

8. The apparatus according to claim 7, wherein the mechanical linkage comprises a seat section for securing within an interior of the seat between the buckle and the indicator unit.

9. The apparatus according to claim 8, wherein seat section comprises a Bowden cable.

10. The apparatus according to claim 6, wherein movement of the lock indicator element to a positive position exposes a visible marker for detection by the camera.

11. The apparatus according to claim 1, further comprising:
a locator marking provided on the indicator unit for detection by the camera.

12. The apparatus according to claim 11, wherein the locator marking comprises one or more orientation features for determining seat orientation based on an image detected by the camera.

13. The apparatus according to claim 1, further comprising:
the camera for detecting an image of the lock indicator and the strap indicator; and
a processor for processing the image to identify the state of the lock indicator and the strap indicator.

14. The apparatus according to claim 13, wherein the processor further comprises an occupancy detector for detecting an occupant in the seat.

15. A system comprising:
a seat for a vehicle;
a seat belt retractor for the vehicle;
a seat belt configured to spool to or from the seat belt retractor; and
a safety apparatus for indicating the usage state of the seat belt, the safety apparatus having:
an indicator unit for mounting to an upper region of the seat;
a lock indicator detectable by a camera and provided on the indicator unit and being operably connectable to a buckle for indicating a state when a tongue of the seat belt is locked into the buckle; and
a strap indicator provided on the indicator unit and being detectable by the camera for indicating a state when a spooled length of the strap exceeds a threshold corresponding to a predetermined minimum length of strap needed to secure a body with the seat belt.

16. The system according to claim 15, wherein the indicator unit comprises a mounting for securing the indicator unit to one of a shoulder of the seat and a headrest.

17. The system according to claim 15, wherein the strap indicator comprises a strap indicator element mechanically movable from a negative position to a positive position for indicating a spooled length of strap has exceeded the threshold.

18. The system according to claim 15, wherein the system comprises the vehicle.

* * * * *